United States Patent Office 3,133,809

Patented May 19, 1964

3,133,809
AGRICULTURAL CHEMICAL COMPOSITIONS

Gilbert Spencer Hartley, Fulbourn, and Roynon Howes, Saffron Walden, England, assignors to Fisons Pest Control Limited, Harston, England No Drawing. Filed July 14, 1960, Ser. No. 42,777
Claims priority, application Great Britain July 22, 1959
12 Claims. (Cl. 71—2.7)

The present invention concerns an improvement in agricultural chemical compositions.

In our U.S. Patent No. 2,907,691 is described a composition containing an agricultural chemical which is insoluble or slightly soluble in water which also contains a compound comprising the salt of trimethylamine or triethylamine and a long chain saturated aliphatic carboxylic acid or an unsaturated aliphatic carboxylic acid with at least two double bonds. These compounds act both as dispersing agent and sticking agent.

It has now been found that where it is desired to spray agricultural chemicals from a height, such as for example from aircraft, by incorporating the composition a volatile base and a long chain saturated aliphatic acid, droplets of these compositions can exhibit sufficiently delayed evaporation to reach the ground in a liquid condition. The mixture of the volatile base and the acid acts also as dispersing agent and sticking agent.

For satisfactory control of evaporation it is necessary that the fatty acids be predominantly saturated. Unsaturated acids like oleic or linoleic do not have a worthwhile effect and, if present as impurities to an extent of more than about 20% of the saturated acids, they reduce the effect of the latter. The effect is also reduced by the incorporation of many well known types of surface active compounds and where it is necessary for additional surface active compounds to be present to control flocculation, sedimentation etc., compounds where the hydrophilic property is derived from condensed alkylene oxide are preferred.

It has further been found that products of the type using lower amines such as trimethylamine or triethylamine, have undesirable features in practice. The amine stearate is not present in a true and mobile solution form, but rather as an extremely finely divided crystalline material producing an abnormal viscosity or gel type structure in the product. The behaviour of the products in this respect is much dependent on the precise way in which they were made up. They are gelatinous if made up hot and allowed to cool in a quiescent condition and more mobile if subjected to violent agitation in the cold. Furthermore, the products build very stable foams when agitated in such a way as to incorporate air.

It has now been found that alkylamines and cycloalkylamines of more than 6 carbon atoms, form solutions of stearic acid and other fatty acids in water which have a much reduced tendency to build up a stable froth. Furthermore, some but not all, of these amines form solutions with stearic acid in water which may be cloudy in appearance but are sufficiently mobile when freshly prepared at ordinary temperatures to be easily sprayable.

Additionally since the higher amine-fatty acid salts or mixtures are usually liquid, and neither highly inflammable nor highly volatile, the formulant can be marketed in this form, whereas the lower amines such as trimethylamine and triethylamine are highly volatile and inflammable and present serious inconveniences in use.

In the spraying of agricultural chemicals, and particularly in aerial spraying, it is desirable to minimise the volume of liquid sprayed. In the case of many chemicals low volume formulations are not practicable on account of the rapid evaporation of the spray droplets which results in the chemical arriving on the crop in a dry form but too coarse to be adherent as a dust. The present invention provides a composition which on account of its delayed evaporation is capable of being sprayed at low volume rates, for example 1–2 gallons per acre.

Accordingly the present invention is for a composition containing an agricultural chemical which also contains an amine of more than 6 carbon atoms, and a long chain saturated aliphatic carboxylic acid.

The compositions according to the present invention may comprise where appropriate aqueous suspensions or solutions containing the agricultural chemical and an amine and a long chain aliphatic carboxylic acid as identified suitably diluted for spraying on to a crop. The compositions may also be concentrates for storage and sale which may be in the form of more or less stiff pastes intended to be diluted to spray strength on the spot. The compositions may even be dry powders prepared by reduction to dryness, if this is possible without decomposition and providing that the amine carboxylic acid mixture is not a liquid at normal temperatures, or by impregnating a suitable absorbent powder. The compositions of the invention may of course contain in addition inert diluents and other compounds common in spray liquids such as suspending agents, antiflocculants and the like.

Owing to the low viscosity of aqueous solutions of the mixtures of these amines with the fatty acid, for example stearic acid, in the case of water insoluble agricultural chemicals it is not usually practicable to supply a liquid concentrate since the insoluble agricultural chemical sediments in storage and, after a considerable period, can only with difficulty be resuspended.

In such cases therefore, the amine fatty acid mixture is preferably provided as a separate liquid concentrate in one pack and the agricultural chemical, for example as a fine powder, in another, to be mixed together with water immediately prior to spraying.

Accordingly a further embodiment of the invention is for a formulant for agricultural chemical compositions which comprise a salt or mixture of a fatty acid and an amine or more than 6 carbon atoms.

The agricultural chemical may comprise a fungicide, pesticide, herbicide, plant growth regulant or other chemical used to ensure plant health, and may be water soluble or water insoluble. However the invention is of particular advantage in the case of agricultural chemicals which are insoluble or substantially insoluble in water. According to a preferred embodiment of the invention the agricultural chemical comprises a fungicidal copper compound such as cuprous oxide or copper oxychloride. The present invention however is not restricted to such compounds and may contain other fungicides such for example as the nickel fungicides, for example nickel hydroxide; the organo sulphur fungicides, for example tetramethylthiuram disulphide and divalent metal salts, such as zinc and manganese, of ethylene-bis-dithiocarbamic acid; insecticides such for example as DDT, BHC, sevin (alpha-naphthyl ester of N-methyl carbamic acid), aldrin (1:2:3:4:10:10 - hexachloro - 1:4:4a:5:8:8a - hexahydro-1:4-endo, exo-5:8-dimethano-naphthalene) and dieldrin (1:2:3:4:10:10 - hexachloro - 6:7 - epoxy 1:4:4a:5:6:7:8:8a - octahydro - 1:4-endo, exo-5:8-dimethano-naphthylene), bis-N:N:N'N' - tetramethylphosphoro-diamidic anhydride, and O,O-dimethyl-S-(N-methyl-carbamoyl-methyl)phosphorodithioate; or herbicides such as N-parachlorophenyl - N'N' - dimethyl-urea, and simazin (2-chloro-4:6-bis-ethyl-amino-triazine); or mixtures of any of the above together with other materials.

The long chain saturated aliphatic carboxylic acid may comprise for example an acid which is solid at normal temperatures preferably containing at least 13 carbon atoms, and for example 14–22 carbon atoms in the chain, such as myristic acid, palmitic acid, arachidic acid, behenic acid and stearic acid. The long chain saturated aliphatic carboxylic acid is preferably stearic acid. If desired, mixtures of any of these acids may also be used, and in any event the commercial products normally comprise mixtures.

The amines of higher molecular weight suitably comprise amines of more than 6 carbon atoms. Preferably the amine does not contain more than 16 carbon atoms since amines of higher molecular weight than this tend to form two-phase mixtures with fatty acids and water. The amine used according to the present invention suitably comprises tertiary amines such as tri-n-propyl, tri-isopropyl, methyldipropyl, methyldiallyl, methyldibutyl, methyldiamyl, dimethyloctyl, dimethylcyclohexyl, dimethyldecyl, tri-n-butyl, triamyl, benzyldimethyl, benzyldiethyl, (m-methylbenzyl)diethylamines, or secondary amines such as methyloctyl, ethylamyl, methylcyclohexyl, methylbenzyl, methyldecylamines or primary amines such as octyl and decyl amines. If desired mixtures of any of these amines together or with other amines may be used.

It has been found particularly advantageous to use amines of 9–12 carbon atoms. According to a preferred embodiment of the invention the amine is methyldibutylamine or tripropylamine.

When the amine/fatty acid is to be used in conjunction with fungicidal low soluble copper compounds such as the oxychloride, it is preferable not to use primary alkylamines since these form soluble copper complexes and this tendency is also present, but to a much reduced extent, with secondary alkylamines. It is therefore preferred in such cases to use tertiary alkylamines.

The higher amines and the fatty acids form solutions when mixed together. Thus for example stearic acid forms a homogenous liquid mixture with methyl dibutylamine even when the components are present in stoichiometric proportions. The amine may be used in proportions over a wide range comprising stoichiometric, or greater or less proportion than stoichiometric. It is preferred to use the amine in amount comprising 5–100% excess over the stoichiometric equivalent.

The present invention is also for these solutions or salts of said higher amines and fatty acids per se as new compositions of matter. These new compositions may be made by mixing the amine and the fatty acid together, suitably for example by dissolving the fatty acid in the amine.

The solution of the amine and the long chain aliphatic acid may be incorporated in the agricultural composition in amounts over a wide range, for example in amount comprising from 1–50% by weight of the weight of the agricultural chemical. It is preferred normally to incorporate the said salt in amount comprising 5–20% by weight of the weight of the agricultural chemical. Although the solution of the amine and fatty acid may be liquid at room temperature it is normally used in sufficiently small amount to make possible its incorporation into a wettable powder where the agricultural chemical is a solid. Some of the agricultural chemicals are, however, not capable of absorbing much liquid material without losing their desirable property of free flow, and in such cases in order to make a satisfactory sprayable wettable powder it is desirable to include a biologically inert mineral selected for its good absorbent properties, such as silica gel, sepiolite or special absorbent clays.

When the spray liquid is made up by agitating together in water the solution of the amine and the long chain aliphatic acid with the agricultural chemical, no other surface active compound is necessary, but the use of such compounds in addition, providing they do not interfere with the control of evaporation, is permissible. Such further materials may comprise surface active compounds in which the hydrophilic property is derived from condensed alkylene oxide, and may for example be of the alkylene oxide block polymer type or of the alkylene oxide-complex type. Surface active agents of the alkylene oxide block polymer type which may be mentioned include polypropylene oxide or block polymers of ethylene oxide and propylene oxide (such as for example the commercially available material Pluronic L61). Surface active agents of the alkylene oxide-complex type which may be mentioned include condensation products of ethylene oxide with various hydrophobic hydroxy compounds containing about 5–30 ethylene oxide units per hydrophobic unit. The hydrophobic unit may comprise for example an alkyl phenol such as octyl cresol or nonyl phenol (such for example as in the commeracially available material Lissapol N) or a fatty alcohol such as dodecyl alcohol (such for example as the commercially available material Sersal LA20) or cetyl alcohol or oleyl alcohol (such for example as the commercially available material Ethylan O.E.), or the ester of a polyhydric alcohol, for example sorbitol, with a fatty acid. These surface active agents should not be used in amount in excess of the amount required to maintain the composition in a suitable condition for handling and storage and the use of excess over this amount may result in interference with the retarding effect on evaporation of the composition. It has been found desirable to use the surface active agents in which the hydrophilic property is derived from condensed alkylene oxide in amount less than 30%, for example 1–30% of the weight of the salt or mixture of the volatile base and aliphatic acid, and preferably 5–20% of the weight of the salt or mixture of the volatile base and aliphatic acid.

The surface active agents of the type indicated while ensuring a stable and fluid suspension do not disturb the retarding effect on evaporation of the salt of a volatile base and a long chain saturated aliphatic carboxylic acid. Surface active agents of other types can interfere with the evaporation retardation of the composition.

The salts or mixtures of amine and fatty acids may be solids but are usually liquids at temperatures above about 20–30° C, but at lower temperatures the latter are frequently of semi-solid or waxy consistency, and present difficulties in solution in water after storage. These disadvantages can be overcome by the addition to the salt or mixture of a solvent in amount sufficient to ensure that the complete composition is a homogeneous liquid at the lowest temperature at which it is to be stored or used.

Many organic liquids have some effect in reducing the temperatures below which the amine salts or complexes begin to solidify, and are also sufficiently soluble in water to avoid the formation of a separate liquid phase when the composition is diluted with water for spraying. These include lower alcohol, glycols, glycol ethers, ketones, esters, glycerol, dioxane, etc., but it has been found that a particularly effective group of solvents, as judged by the lowering of the temperature of solidification of the amine salt or complex obtained with a given proportion of organic liquid comprises the aliphatic alcohols of 3, 4 or 5 carbon atoms, preferably with branched chains, when mixed with a suitable proportion of water. In the absence of water the aliphatic alcohols are not good solvents for the amine salts or complexes.

According to a further embodiment the present invention is for a new composition of matter comprising a salt or mixture of an amine and a fatty acid as defined together with at least one aliphatic alcohol of 3, 4 or 5 carbon atoms and water.

The aliphatic alcohol may comprise isopropyl alcohol, normal butyl alcohol, secondary butyl alcohol, or secondary amyl alcohol (pentanol-2) or mixtures of any of these alcohols together or with other alcohols. However it is preferred that the alcohol should comprise a branched chain compound and according to a preferred embodiment of the invention the alcohol is tertiary butyl alcohol, isobutyl alcohol, tertiary amyl alcohol or isoamyl alcohol or mixtures thereof.

The volatile base used according to the present invention suitably comprises an amine which may be a primary, secondary or tertiary amine and according to a preferred embodiment of the invention contains from 6–16 carbon atoms. Examples of amines which may be mentioned include methyldipropyl, tripropyl, methyldibutyl, dimethyloctyl, dimethylcyclohexyl, dimethyldecyl, methyloctyl, methylcyclohexyl and octyl amines.

The following examples are given to illustrate the present invention:

EXAMPLE 1

0.35 pound of stearic acid was dissolved with application of heat in 0.35 pound (100% excess) of methyldibutylamine. The combined liquid product was added to 8 pounds of water together with 3.5 pounds of finely divided copper oxychloride. On agitating a satisfactory fluid suspension (1 gallon) was formed which did not gel appreciably on standing, and did not froth undesirably. This was sprayed through a T 8001 jet at 80 pounds per square inch pressure. After falling through 20 feet in a temperature of 90° F. and 40% relative humidity, a deposit was obtained on pea leaves which, after drying for a further hour, was not washed off by the application of 5 inches of artificial rain. This suspension is suitable for application at a rate of 1 gallon per acre.

Purely by way of comparison, a suspension of copper oxy-chloride of the same concentration but containing 0.1% octyl-phenol polyethylene oxide wetting agent in place of the amine fatty acid mixture was sprayed under similar conditions. After falling 20 feet most of the spray arrived as a non-adherent dust. A few larger drops were collected but were washed off easily on application of artificial rain.

EXAMPLE 2

A preparation similar to the above but using 0.175 pound methyl dibutylamine (stoichiometric equivalent of stearic acid) was sprayed similarly. The deposit obtained on pea leaves consisted of rather more compact droplets, but was again adherent even after heavy artificial rain.

EXAMPLE 3

As in Example 1 but using 0.2 pound of dimethyl octylamine (10% excess over stoichiometric equivalence with stearic acid) in place of methyl dibutylamine. Tested in the absence of copper oxychloride but in the same amount of water this product gave a milky solution with only minor frothing tendency and rather less viscous than in the case of methyldibutylamine. When sprayed with suspended copper oxychloride, deposit was again obtained satisfactorily on the target and, after drying, was not washed off by artificial rain.

EXAMPLE 4

As in Example 1 but using 1.94 pounds of copper oxychloride and 0.49 pound of zinc diethyl dithiocarbamate in place of 3.5 pounds of copper oxychloride alone. Reception and retention on pea leaf target were again very satisfactory.

EXAMPLE 5

1 pound of palmitic acid was dissolved with the application of heat in 1 pound of tripropylamine, and the solution was added with 20 pounds of finely ground zinc ethylene bisdithiocarbamate to 13 gallons of water. The mixture was agitated and formed a satisfactory fluid suspension which did not gel appreciably on standing nor froth undesirably and which was sprayed through a T 8001 jet at 80 pounds per square inch pressure. After falling 20 feet in a temperature of 90° F. and 40% relative humidity, a deposit was obtained on pea leaves which, after drying for a further hour, was not washed off by the application of 5 inches of artificial rain. This suspension is suitable for application at 1–2 gallons per acre.

Purely by way of comparison, a suspension of zinc ethylenebisdithiocarbamate was prepared by adding 20 pounds of finely ground zinc ethylenebisdithiocarbamate with 2 pounds of dodecyl alcohol-polyethylene oxide wetting agent and was srpayed under similar conditions. After falling 20 feet most of the spray arrived as a non-adherent dust.

EXAMPLE 6

1 pound of arachidic acid was dissolved with the application of heat in 0.8 pound of methyldiallyamine and the solution was added with 30 pounds of finely ground alpha-naphthyl ester of N-methyl carbamic acid to 30 gallons of water. The mixture was agitated and formed a satisfactory fluid suspension which did not gel appreciably on standing nor froth undesirably, and on spraying as indicated in Example 5 formed a deposit which was adherent even after heavy artificial rain.

EXAMPLE 7

1 pound of stearic acid was dissolved with the application of heat in 0.75 pound of tripropylamine and the solution was added with 3 pounds of finely ground DDT to 4 gallons of water. The mixture was agitated and formed a satisfactory fluid suspension which did not gel appreciably on standing nor froth undesirably, and on spraying as indicated in Example 5 formed a deposit which was adherent even after heavy artificial rain.

EXAMPLE 8

1 pound of stearic acid was dissolved in 0.8 pound of benzyldimethylamine and the solution was added with 4 pounds of O,O-dimethyl-S-(N-methyl-carbamoylmethyl) phosphorodithioate to 40 gallons of water. The mixture was agitated and formed a satisfactory fluid suspension which did not gel appreciably on standing nor froth undesirably, and on spraying as indicated in Example 5 formed a deposit which was adherent even after heavy artificial rain.

EXAMPLE 9

1 pound of a 50–50 mixture of stearic acid and palmitic acid was dissolved in 1 pound of a 50–50 mixture of tripropylamine and tributylamine and the solution was added with a finely ground mixture of 6 pounds of sulphur and 12 pounds of copper oxychloride to 5 gallons of water. The mixture was agitated and formed a satisfactory solution which did not gel appreciably on standing nor froth undesirably, and on spraying as indicated in Example 5 the spray arrived as droplets on the plants. By way of comparison an analagous composition containing octylphenolpropylene oxide wetting agent in place of the amine fatty acid mixture when sprayed under similar conditions arrived on the plants largely as dust.

EXAMPLE 10

1 pound of stearic acid was dissolved with the application of heat in 0.75 pound of octylamine and the solution was added with 15 pounds of finely ground 2-chloro-4:6-bisethylamino-triazine, to 5 gallons of water. The mixture was agitated and formed a satisfactory fluid suspension, which did not gel appreciably on standing nor froth undesirably, and on spraying as indicated in Example 5 formed a deposit which was adherent even after heavy artificial rain.

EXAMPLE 11

0.45 pound of stearic acid was dissolved with the application of heat in 0.3 pound of methylcyclohexylamine and the solution added to 1 gallon of water together with 3.5 pounds of finely divided copper oxychloride. On agitating a satisfactory fluid suspension was obtained which did not gel appreciably on standing nor froth undesirably, and on spraying as indicated in Example 5 formed a deposit which was adherent even after heavy artificial rain.

EXAMPLE 12

0.35 pound of stearic acid was dissolved with the application of heat in 0.35 pound of methyldibutylamine. The combined liquid product was added to 1 gallon of water together with 1 pound of sevin. On agitating a satisfactory fluid suspension was obtained which did not gel appreciably on standing nor froth undesirably, and on spraying as indicated in Example 5 formed a deposit which was adherent even after heavy artificial rain.

EXAMPLE 13

Stoichiometric amounts of the amine indicated below and stearic acid were taken, and the stearic acid was dissolved with warming in the amine and the resulting solution allowed to cool. The product set to a waxy solid or crystalline mass. The melting point of the amine stearate was then measured and the results are given below:

| | Melting point, °C |
|---|---|
| Methyl di-normalpropylamine stearate | 23 |
| Dimethyl-normalamylamine stearate | 31 |
| Dimethyl iso-amylamine stearate | 28 |
| Di-isobutylamine stearate | 41 |
| Di-secondarybutylamine stearate | 33 |
| Di-normalbutylamine stearate | 30 |
| Dimethyl cyclohexylamine stearate | 24 |
| Methyldibutylamine stearate | 21 |
| Methyldi-secondarybutylamine stearate | 23 |
| Dimethyloctylamine stearate | 31 |
| Di-isoamylamine stearate | 33 |
| Di-normalamylamine stearate | 17 |
| Methyl di-normalamylamine stearate | 25 |
| Dimethyldecylamine stearate | 31 |
| Methyl dihexylamine stearate | 13 |

EXAMPLE 14

A large number of amine stearates as identified in the following table were prepared as described in Example 13. In each case a 1% by weight solution of the amine stearate in water was prepared, and 50 millilitres of this solution placed in a 100 millilitre solution and shaken for 1 minute. The height of the froth was measured immediately, and thereafter at time intervals of 10, 30, 60 and 120 minutes. The height of the froth in centimetres is given in the table below:

Solely by way of comparison salts of a number of amines of up to 6 carbon atoms were tested in an exactly similar way, and these results are given in the lower part of the table below:

| Compound | Froth level at time interval, minutes | | | | |
|---|---|---|---|---|---|
| | 0 | 10 | 30 | 60 | 120 |
| Dimethyl iso-amylamine stearate | 0.5 | 0.2 | 0.1 | 0 | 0 |
| Di-secondary butylamine stearate | 4.5 | 0.6 | 0.2 | 0 | 0 |
| Di-normalbutylamine stearate | 3.0 | 0 | 0 | 0 | 0 |
| Nonylamine stearate | 0 | 0 | 0 | 0 | 0 |
| Di-isoamylamine stearate | 0 | 0 | 0 | 0 | 0 |
| Di-n-amylamine stearate | 0 | 0 | 0 | 0 | 0 |
| Methyldi-n-amylamine stearate | 0 | 0 | 0 | 0 | 0 |
| Tributylamine stearate | 0 | 0 | 0 | 0 | 0 |
| Methyl dihexylamine stearate | 0 | 0 | 0 | 0 | 0 |
| Methyldioctylamine stearate | 0 | 0 | 0 | 0 | 0 |
| Diethylamine stearate | 5.5 | 5.0 | 5.0 | 5.0 | 5.0 |
| Triethylamine stearate | 4.0 | 3.8 | 2.8 | 2.8 | 2.5 |
| Dimethyl-secondary butylamine stearate | 8.0 | 7.0 | 7.0 | 6.6 | 2.5 |
| Dimethyl-n-butylamine | 5.0 | 4.2 | 3.8 | 3.5 | 2.5 |

EXAMPLE 15

Two compositions were made up as follows:

*Composition A*

| | Kg. |
|---|---|
| Methyl dibutylamine | 0.8 |
| Stearic acid | 1.1 |
| The octyl cresol polyethylene oxide condensation product sold as Lissapol NX | 0.3 |

*Composition B*

| | |
|---|---|
| Methyl dibutylamine | 0.8 |
| Stearic acid | 1.1 |
| The oleylalcohol-polyethylene oxide condensation product sold as Ethylan O.E | 0.3 |

In each case the composition was stirred into about 20 litres of water and 16 kilograms of copper oxychloride were added with further agitation and the total volume made up to 67 litres with further water.

Subsequently each of preparations from compositions A and B were transferred to the spray tank of a helicopter adapted to spray through T 8002 jets at 80 pounds per square inch pressure (5.5 kilograms per square centimetre) and was sprayed at the rate of 1 gallon/acre (4.54 litres/hectare) over a crop of potatoes. The spray deposited by each preparation containing composition A or composition B gave a dense coverage of the leaves and was not washed off by running water.

Solely by way of comparison the following compositions were made:

*Composition C*

| | Kg. |
|---|---|
| Methyl dibutylamine | 0.8 |
| Stearic acid | 1.1 |
| Sulphite lye | 1.0 |

*Composition D*

| | |
|---|---|
| Methyl dibutylamine | 0.8 |
| Stearic acid | 1.1 |
| Sodium dodecyl sulphate | 0.3 |

Each of compositions C and D were incorporated in preparations in exactly the same way as for compositions A and B. In each case the resulting preparations were sprayed exactly as described above and under the same conditions and it was found that with the preparations incorporating each of composition C and composition D only a very light coverage of the leaves with spray deposit was obtained and that this was readily washed off with running water.

EXAMPLE 16

2 pounds of stearic acid were dissolved in 1.3 pounds of methyldibutylamine with application of heat. The combined liquid product was mixed with 1.6 pounds of tertiary butyl alcohol and 3.9 pounds of water. The resulting solution was fluid and homogenous at temperatures down to −2° C. When added to 80 pounds of water the solution was clear, and when 35 pounds of copper oxychloride were stirred into this diluted solution a satisfactory fluid suspension resulted.

The combined liquid product of the stearic acid and the methyl dibuylamine alone began to deposit solid when cooled to 19° C., and was completely solid at 10° C. The solid product dissolved only with difficulty in water at 15° C.

EXAMPLE 17

A composition of the same type as described in Example 1 contained 2 pounds of stearic acid, 1.3 pounds of methyldibutylamine, 1.7 pounds of isopropyl alcohol and 3.3 pounds of water. The resulting solution remained fluid and homogeneous at temperatures down to 5° C. and was easily dilutable with water.

EXAMPLE 18

A solution was made from 2 pounds of stearic acid, 1.3 pounds of methyldibutylamine, 1.7 pounds of isoamyl alcohol and 1 pound of water. The solution was fluid and homogeneous at temperatures down to 0° C., and was easily dilutable with water.

Solely by way of comparison analogous solutions were prepared but including 1.7 pounds of the solvent listed in column 1 of the table below in place of isoamyl alcohol. The solidification temperature of the solution is given in column 2 of the table below. It will be noted that solidification occurred in all cases at temperatures over 9° C., which may be met in storage conditions.

| Column 1<br>Solvent | Column 2<br>Solidification Temperature, °C. |
|---|---|
| Methyl alcohol | 12 |
| Ethyl alcohol | 10 |
| Ethylene glycol | 14 |
| Hexylene glycol | 9 |
| Ethylene glycolmonomethyl ether | 15 |
| Glycerol | 15 |
| Tetrahydrofurfuryl alcohol | 12 |

EXAMPLE 19

3.3 pounds of a solution of stearic acid in an equal weight of methyldibutylamine, and 0.52 pounds of the octylcresol polyethylene oxide condensation product sold as Lissapol NX were dissolved in 10 gallons of water to which was added with agitation an intimate mixture of 19.4 pounds of copper oxychloride and 6.3 pounds of technical manganese ethylene bis dithiocarbamate (80% purity).

This mixture was sprayed at 2 gallons per acre through T 8002 jets at 80 pounds per square inch pressure and gave a deposit adhering strongly to the leaves of a banana crop which was only partly washed off by the application of 12 inches of artificial rain.

We claim:
1. Composition of matter useful in treating plants comprising
    (1) agricultural pesticidal chemical,
    (2) long chain saturated aliphatic carboxylic acid of 14 to 22 carbon atoms, and
    (3) an amine selected from the group consisting of alphatic amine of from 7 to 16 carbon atoms, (lower alkyl) (cyclohexyl) amine of from 7 to 16 carbon atoms, (di-lower alkyl) (cyclohexyl) amine of from 7 to 16 carbon atoms, (lower alkyl) (lower alkylphenyl) amine of from 7 to 16 carbon atoms, and (di-lower alkyl) (lower alkylphenyl) amine of from 7 to 16 carbon atoms, said amine being present in amount comprising 5–100% excess over the stoichiometric equivalent, and said acid and amine comprising 1–50% by weight of the agricultural chemical.

2. Composition of matter useful in treating plants comprising
    (1) agricultural pesticidal chemical,
    (2) long chain saturated aliphatic carboxylic acid of 14 to 22 carbon atoms, and
    (3) methyldibutylamine, said methyldibutylamine being present in amount comprising 5–100% excess over the stoichiometric equivalent, and said acid and methyldibutylamine being present in amount comprising 1–50% by weight of the agricultural chemical.

3. Composition of matter useful in treating plants comprising
    (1) agricultural pesticidal chemical,
    (2) long chain saturated aliphatic carboxylic acid of 14 to 22 carbon atoms, and
    (3) tripropylamine, said tripropylamine being present in amount comprising 5–100% excess over the stoichiometric equivalent, and said acid and tripropylamine being present in amount comprising 1–50% by weight of the agricultural chemical.

4. Composition of matter useful in treating plants comprising
    (1) agricultural pesticidal chemical,
    (2) long chain saturated aliphatic carboxylic acid of 14 to 22 carbon atoms,
    (3) an amine selected from the group consisting of aliphatic amine of from 7 to 16 carbon atoms, (lower alkyl) (cyclohexyl) amine of from 7 to 16 carbon atoms, (di-lower alkyl) (cyclohexyl) amine of from 7 to 16 carbon atoms, (lower alkyl) (lower alkylphenyl) amine of from 7 to 16 carbon atoms, and (di-lower alkyl) (lower alkylphenyl) amine of from 7 to 16 carbon atoms, said amine being present in amount comprising 5–100% excess over the stoichiometric equivalent and said acid and amine comprising 1–50% by weight of the agricultural chemical,
    (4) saturated aliphatic alcohol of from 3 to 5 carbon atoms, and
    (5) water.

5. Composition of matter useful in treating plants comprising
    (1) agricultural herbicidal chemical,
    (2) long chain saturated aliphatic carboxylic acid of 14 to 22 carbon atoms, and
    (3) an amine selected from the group consisting of aliphatic amine of from 7 to 16 carbon atoms, (lower alkyl) (cyclohexyl) amine of from 7 to 16 carbon atoms, (di-lower alkyl) (cyclohexyl) amine of from 7 to 16 carbon atoms, (lower alkyl) (lower alkylphenyl) amine of from 7 to 16 carbon atoms, and (di-lower alkyl) (lower alkyl phenyl) amine of from 7 to 16 carbon atoms, said amine being present in amount comprising 5–100% excess over the stoichiometric equivalent, and said acid and amine comprising 1–50% by weight of the agricultural chemical.

6. Composition of matter useful in treating plants comprising
    (1) agricultural herbicidal chemical,
    (2) long chain saturated aliphatic carboxylic acid of 14 to 22 carbon atoms, and
    (3) methyldibutylamine, said methyldibutylamine being present in amount comprising 5–100% excess over the stoichiometric equivalent, and said acid and methyldibutylamine being present in amount comprising 1–50% by weight of the agricultural chemical.

7. Composition of matter useful in treating plants comprising
    (1) agricultural herbicidal chemical,
    (2) long chain saturated aliphatic carboxylic acid of 14 to 22 carbon atoms, and
    (3) tripropylamine, said tripropylamine being present in amount comprising 5–100% excess over the stoichiometric equivalent, and said acid and tripropylamine being present in amount comprising 1–50% by weight of the agricultural chemical.

8. Composition of matter useful in treating plants comprising
    (1) agricultural plant growth regulant chemical,
    (2) long chain saturated aliphatic carboxylic acid of 14 to 22 carbon atoms, and
    (3) an amine selected from the group consisting of aliphatic amine of from 7 to 16 carbon atoms, (lower alkyl) (cyclohexyl) amine of from 7 to 16 carbon atoms, (di-lower alkyl) (cyclohexyl) amine of from 7 to 16 carbon atoms, (lower alkyl) (lower alkylphenyl) amine of from 7 to 16 carbon atoms, and (di-lower alkyl) (lower alkyl phenyl) amine of from 7 to 16 carbon atoms, said amine being present in amount comprising 5–100% excess over the stoichiometric equivalent, and said acid and amine comprising 1–50% by weight of the agricultural chemical.

9. Composition of matter useful in treating plants comprising
    (1) agricultural plant growth regulant chemical,
    (2) long chain saturated aliphatic carboxylic acid of 14 to 22 carbon atoms, and
    (3) methyldibutylamine, said methyldibutylamine being present in amount comprising 5–100% excess over the stoichiometric equivalent, and said acid and methyldibutylamine being present in amount comprising 1–50% by weight of the agricultural chemical.

10. Composition of matter useful in treating plants comprising
   (1) agricultural plant growth regulant chemical,
   (2) long chain saturated aliphatic carboxylic acid of 14 to 22 carbon atoms, and
   (3) tripropylamine, said tripropylamine being present in amount comprising 5–100% excess over the stoichiometric equivalent, and said acid and tripropylamine being present in amount comprising 1–50% by weight of the agricultural chemical.

11. Composition of matter useful in treating plants comprising
   (1) agricultural pesticidal chemical,
   (2) long chain saturated aliphatic carboxylic acid of 14 to 22 carbon atoms, and
   (3) an amine selected from the group consisting of aliphatic amine of from 7 to 16 carbon atoms, (lower alkyl) (cyclohexyl) amine of from 7 to 16 carbon atoms, (di-lower alkyl) (cyclohexyl) amine of from 7 to 16 carbon atoms, (lower alkyl) (lower alkylphenyl) amine of from 7 to 16 carbon atoms, and (di-lower alkyl) (lower alkyl phenyl) amine of from 7 to 16 carbon atoms, said acid and amine comprising 1–50% by weight of the agricultural chemical.

12. Method for treating plants comprising
   (1) producing a spray composition by admixing water with
      (a) agricultural pesticidal chemical,
      (b) long chain saturated aliphatic carboxylic acid of 14 to 22 carbon atoms, and
      (c) an amine selected from the group consisting of aliphatic amine of from 7 to 16 carbon atoms, (lower alkyl) (cyclohexyl) amine of from 7 to 16 carbon atoms, (di-lower alkyl) (cyclohexyl) amine of from 7 to 16 carbon atoms, (lower alkyl) (lower alkylphenyl) amine of from 7 to 16 carbon atoms, and (di-lower alkyl) (lower alkyl phenyl) amine of from 7 to 16 carbon atoms, said acid and amine comprising 1–50% by weight of said agricultural chemical, and
   (2) spraying said resultant composition on plants whereby said agricultural chemical is uniformly dispersed and well adhered on said plants.

References Cited in the file of this patent

UNITED STATES PATENTS

| | | |
|---|---|---|
| 2,366,013 | Duncan | Dec. 26, 1944 |
| 2,371,289 | Hamilton et al. | Mar. 13, 1945 |
| 2,863,752 | Hamm et al. | Dec. 9, 1958 |
| 2,907,691 | Hartley et al. | Oct. 6, 1959 |

FOREIGN PATENTS

| | | |
|---|---|---|
| 542,725 | Canada | June 25, 1957 |

OTHER REFERENCES

Bell et al. in "Agricultural Chemicals," April 1950, pages 31 to 34, 99 and 101.